United States Patent
Purvis et al.

(10) Patent No.: US 9,807,350 B2
(45) Date of Patent: Oct. 31, 2017

(54) AUTOMATED PERSONALIZED IMAGING SYSTEM

(75) Inventors: Christopher James Purvis, La Crescenta, CA (US); Joshua B. Gorin, Glendale, CA (US); Cliff Wong, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1524 days.

(21) Appl. No.: 12/914,476

(22) Filed: Oct. 28, 2010

(65) Prior Publication Data
US 2012/0105644 A1    May 3, 2012

(51) Int. Cl.
*H04N 7/18* (2006.01)

(52) U.S. Cl.
CPC ... *H04N 7/181* (2013.01); *G06T 2207/30232* (2013.01)

(58) Field of Classification Search
CPC . G06T 7/004; G06T 2207/30232; H04N 7/18; H04N 7/181; H04N 7/183; H04N 7/188; H04N 2207/30232; G08B 13/19608
USPC .................................................. 348/159, 157
See application file for complete search history.

(56) References Cited

U.S. PATENT DOCUMENTS

| | | |
|---|---|---|
| 5,576,838 A | 11/1996 | Renie |
| 5,751,885 A | 5/1998 | O'Loughlin et al. |
| 6,005,610 A | 12/1999 | Pingali |
| 6,175,343 B1 | 1/2001 | Mitchell et al. |
| 6,463,205 B1 | 10/2002 | Aschbrenner et al. |
| 6,934,461 B1 | 8/2005 | Strub et al. |
| 7,015,954 B1 | 3/2006 | Foote et al. |
| 7,038,709 B1 | 5/2006 | Verghese |
| 7,519,271 B2 | 4/2009 | Strub et al. |
| 2005/0052532 A1 | 3/2005 | Elooz et al. |
| 2006/0064731 A1 | 3/2006 | Kable et al. |
| 2006/0159344 A1* | 7/2006 | Shao ............... G06F 3/0346 382/186 |
| 2007/0038938 A1 | 2/2007 | Canora et al. |
| 2007/0279494 A1 | 12/2007 | Aman et al. |
| 2008/0114633 A1 | 5/2008 | Wolf et al. |
| 2008/0130948 A1 | 6/2008 | Ozer |
| 2009/0059007 A1* | 3/2009 | Wagg et al. ............ 348/157 |
| 2010/0002070 A1* | 1/2010 | Ahiska ..................... 348/36 |

* cited by examiner

*Primary Examiner* — Jared Walker
(74) *Attorney, Agent, or Firm* — Ference & Associates LLC

(57) ABSTRACT

Systems and associated methods for capturing media content for a plurality of guests and intelligently parsing the media content to produce a customized/personalized media product for a particular guest or group of guests are described. A system is configured for combining video data and position tracking data to record a group guest experience or show and automatically provide custom media products. Embodiments record a plurality of guests throughout an experience or show, and simultaneously position track each guest individually. Embodiments utilize the tracking data to extract a sub-sampled video of each guest. This sub-sampled video is combined with additional media automatically according to a script. The result is a personalized video take-away for each guest, which can be created entirely without human intervention.

20 Claims, 7 Drawing Sheets

AUTOMATED PERSONALIZED IMAGING SYSTEM

FIELD OF THE INVENTION

The subject matter presented herein generally relates to customized media content generation.

BACKGROUND

The creation rate of media content, such as pictures and videos, has increased because of the wide availability of digital systems, such as digital cameras. A popular use of digital systems is to memorialize special events, such as trips and vacations. In this context, it is common for individuals to have pictures and/or videos taken of themselves and/or family and friends during a variety of activities.

Guests often have their pictures taken at destination venues, such as amusement and theme parks. For example, guests often desire to have photographs taken posing with a particular character, engaging in park activities, and so on. In this regard, the various venues that attract guests attempt to provide services to guests in order to assist the guests in creating custom media content for memorializing the experiences had at these venues. Conventionally this has been accomplished by either taking pictures/videos of guests posing with particular characters and/or participating in other park activities, and providing the guests with the opportunity to purchase the photos/videos at a later time. For example, some venues provide a photographer at the venue to take pictures of guests, note which guest the pictures correspond to, and provide the guests with the opportunity to purchase the pictures.

SUMMARY OF THE INVENTION

Embodiments provide a system configured to capture media content for a plurality of guests and intelligently parse the media content to produce a customized media product for a guest or group of guests. Embodiments broadly contemplate systems and associated methods for combining video data and human position tracking data to record a group guest experience or show and provide customized/personalized media products automatically. For example, embodiments record an entire crowd throughout an experience or show and simultaneously position track each guest individually. Embodiments utilize the tracking data to extract sub-sampled video portions of each guest for the duration of the show. This sub-sampled video is edited and combined with additional media automatically by a scripted editing sequence module. The result is a personalized video take-away for each guest, which can be created entirely without human intervention.

In summary, one aspect provides a method for generating a custom media product comprising: receiving tracking data derived from a position tracking system, the tracking data corresponding to locations of a plurality of guests within a predefined area; receiving video data derived from one or more cameras placed at one or more predetermined positions about the predefined area; correlating one or more locations of the plurality of guests within the predefined area with one or more areas of one or more frames of video data; sub-sampling the one or more areas of the one or more frames of video data; and generating a custom media product for a guest of the plurality of guests using the one or more areas sub-sampled from the one or more frames of video data.

Another aspect provides a computer program product comprising: a computer readable storage medium having computer readable program code embodied therewith for generating a custom media product, the computer readable program code comprising: computer readable program code configured to receive tracking data derived from a position tracking system, the tracking data corresponding to locations of a plurality of guests within a predefined area; computer readable program code configured to receive video data derived from one or more cameras placed at one or more predetermined positions about the predefined area; computer readable program code configured to correlate one or more locations of the plurality of guests within the predefined area with one or more areas of one or more frames of video data; computer readable program code configured to sub-sample the one or more areas of the one or more frames of video data; and computer readable program code configured to generate a custom media product for a guest of the plurality of guests using the one or more areas sub-sampled from the one or more frames of video data.

A further aspect provides a system for generating a custom media product comprising: one or more processors; and a memory operatively connected to the one or more processors; wherein, responsive to execution of computer readable program code accessible to the one or more processors, the one or more processors are configured to: receive tracking data derived from a position tracking system, the tracking data corresponding to locations of a plurality of guests within a predefined area; receive video data derived from one or more cameras placed at one or more predetermined positions about the predefined area; correlate one or more locations of the plurality of guests within the predefined area with one or more areas of one or more frames of video data; sub-sample the one or more areas of the one or more frames of video data; and generate a custom media product for a guest of the plurality of guests using the one or more areas sub-sampled from the one or more frames of video data.

The foregoing is a summary. For a better understanding of example embodiments, together with other and further features and advantages thereof, reference is made to the following description, taken in conjunction with the accompanying drawings, and the scope of the invention will be pointed out in the appended claims.

DETAILED DESCRIPTION

Figure 1:
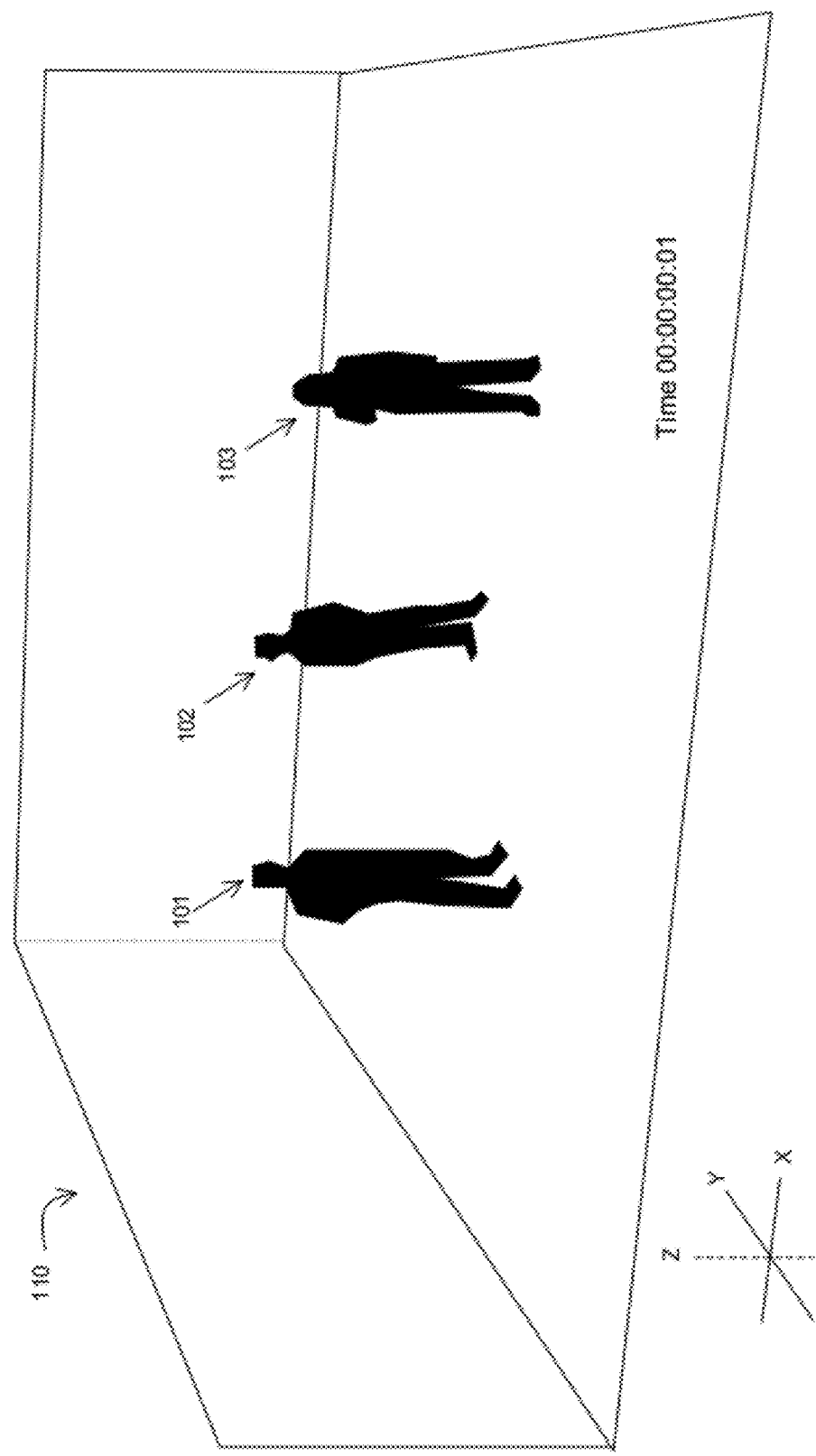
FIG. 1 illustrates an example show space.

Components of the embodiments, as generally described and illustrated in the figures herein, may be arranged and designed in a wide variety of different configurations in addition to the described example embodiments. Thus, the following more detailed description of example embodiments, as represented in the figures, is not intended to limit the scope of the invention, as claimed, but is merely representative of example embodiments. Furthermore, the described features, structures, or characteristics may be combined in any suitable manner in one or more embodiments. In the following description, numerous specific details are provided to give a thorough understanding of embodiments.

Reference throughout this specification to embodiment(s) means that a particular feature, structure, or characteristic described in connection with the embodiment is included in at least one embodiment. Thus, appearances of the phrases "certain embodiments" or "example embodiment" or the like in various places throughout this specification are not necessarily all referring to the same embodiment.

One approach to producing custom media products is to take still photographs/videos of guests individually and create custom media products as guest "take-aways" for encounters with characters and other attractions in theme parks. The inventors have recognized, however, that it is desirable to be able to make personalized videos for each guest that participates in a themed experience (such as an interactive show or group character meet and greet), without expending unnecessary resources. The inventors have recognized that this is not economically feasible with current technology. For example, conventional approaches dictate use of an inordinate amount of resources (such as numerous cameras, photographers, and video editing personnel) to produce personalized videos for each guest.

Accordingly, embodiments provide a system configured to capture media content for a plurality of guests and intelligently parse the media content to produce a customized media product for a guest or group of guests. Embodiments provide a system that combines one or more video camera(s) and human position tracking technologies to record a group guest experience or show (like a character meet and greet show). The entire crowd can be recorded (videotaped) together throughout the duration of the show, and simultaneously each guest can have their position tracked by one or more tracking systems. After the show sequence is finished or at any appropriate time production of a custom media product is desirable, the tracking data is used to extract a sub-sampled video of each guest for the duration of the show. This sub-sampled video is automatically combined with sound effects, video overlay effects, opening and closing bumpers, and the like according to a script by a scripted editing sequence module. The result is an individualized, personalized, video take-away for each guest, which can be created entirely without human intervention.

The description now turns to the figures. The illustrated example embodiments will be best understood by reference to the figures. The following description is intended only by way of example and simply illustrates certain embodiments representative of the invention, as claimed.

Figure 2:
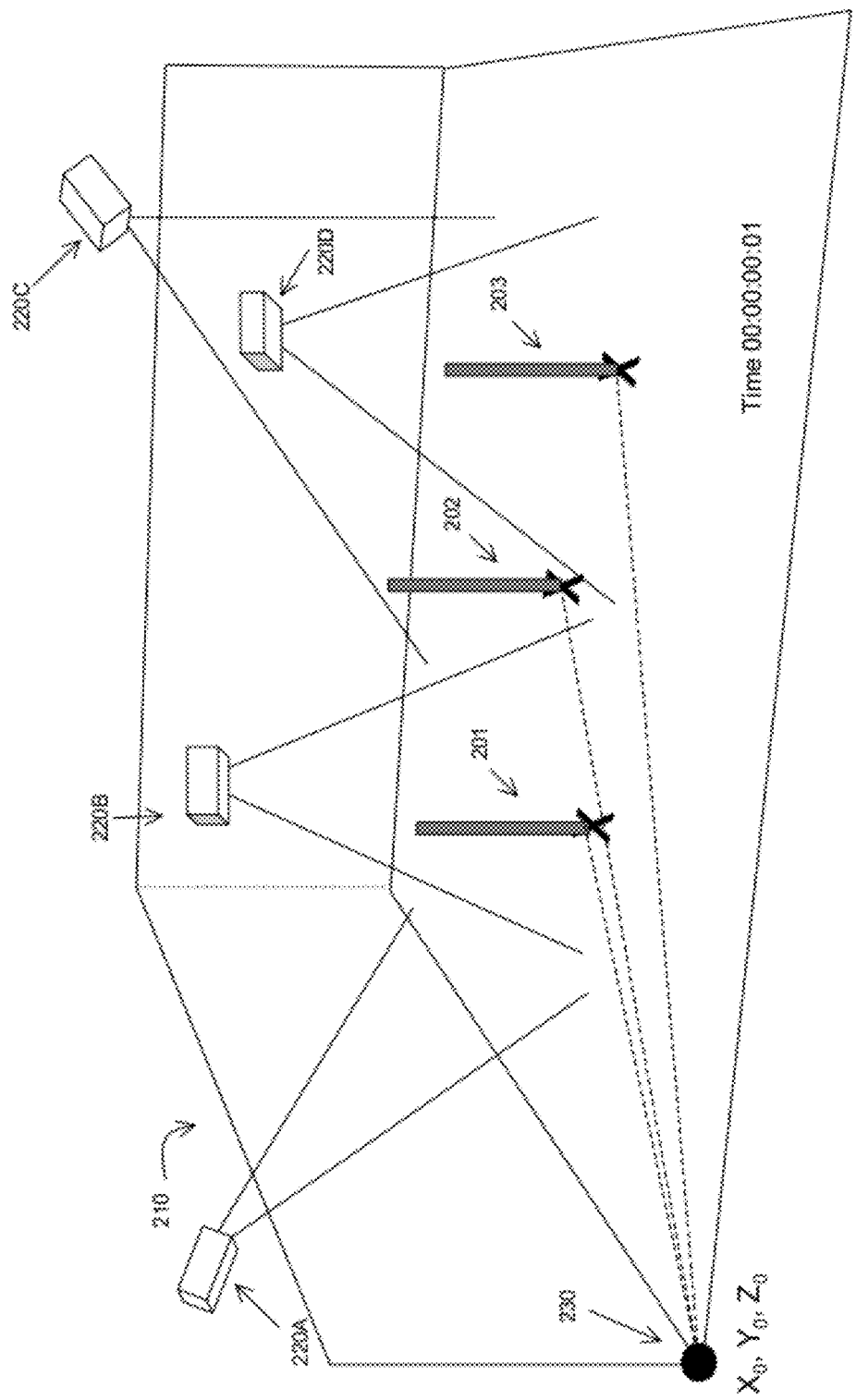
FIG. 2 illustrates example components of a system for tracking within a show space.
Figure 3:
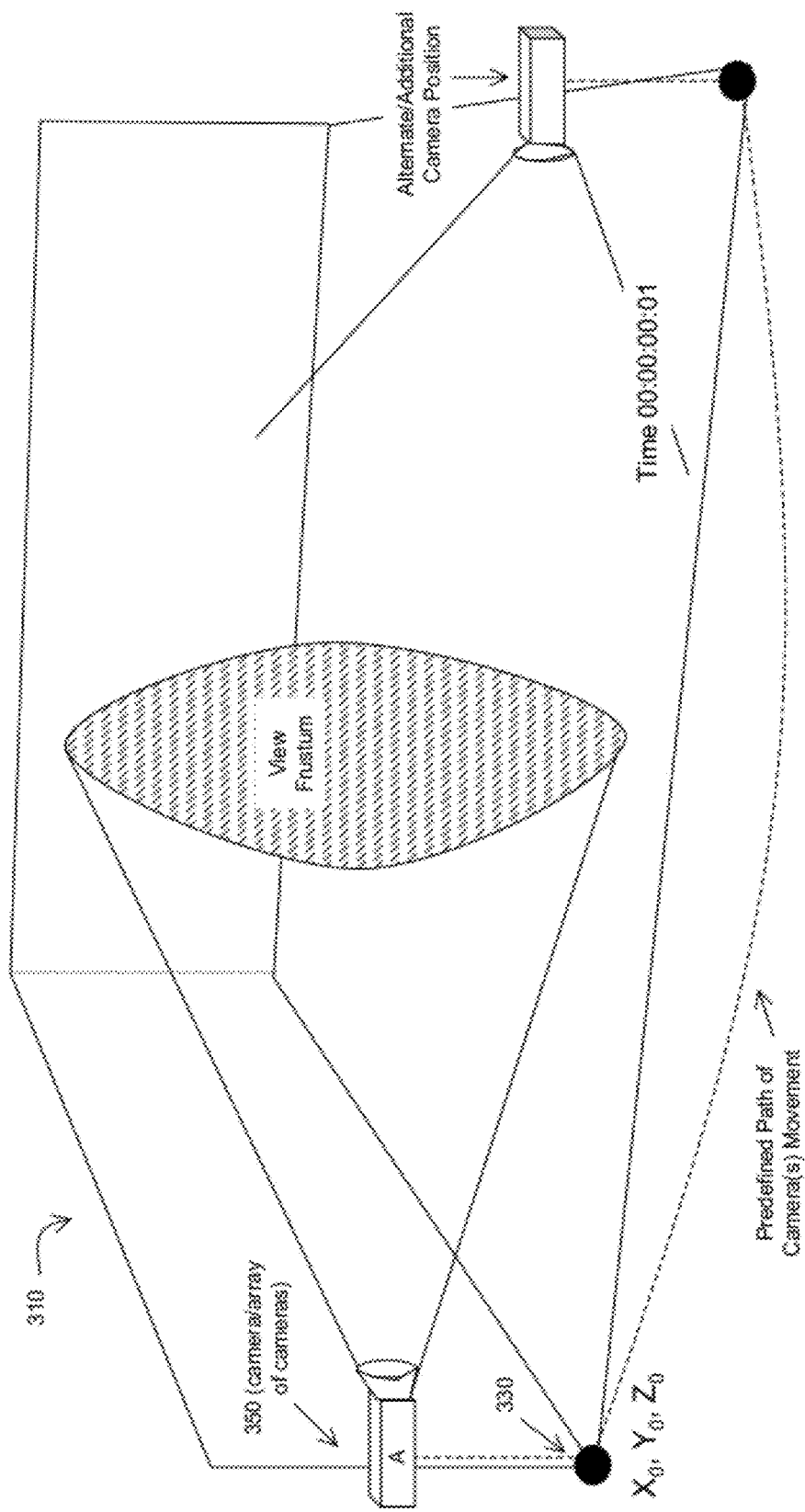
FIG. 3 illustrates example components of a system for recording within a show space.

FIGS. 1-3 illustrate an example show space and system for monitoring the same. Referring to FIG. 1, an example system monitors the defined show space 110 and guests 101, 102, 103, therein. The guests 101, 102, 103 (as well as other objects of interest in the show, such as theme park characters, inanimate objects, and the like) move about the defined show space 110 throughout the show. However, at any given time (for example, time 00:00:00:01 sec), each guest 101, 102, 103 occupies a particular location within the defined show space 110. Rather than employing a variety of cameras to record each guest individually, embodiments employ a reduced number of cameras, such as a single ultra-high resolution camera, to capture video content of the entire group of guests 101, 102, 103.

As illustrated in FIG. 2, embodiments also utilize a tracking system with tracking components 220A, 220B, 220C, 220D placed a predefined points. The tracking system is capable of tracking multiple objects (for example, guests 101, 102, 103) in "real-time" (that is, nearly instantaneously), and providing tracking data including coordinate information (at least X, Y coordinates, but preferably also a "Z" coordinate/height) for each tracked object. A non-limiting example of a suitable tracking system is TYZX PersonTrack System available from TYZX Inc. The tracking system should be one that is able to monitor the defined show space 210 in its entirety such that objects of interest, such as guests 101, 102, 103 can be tracked throughout the show. Moreover, a tracking system can include the use of devices and/or tags carried by the guests themselves and/or in combination with environmental sensors such as visual or sonar tracking sensors.

For example, FIG. 2 illustrates tracking system components 220A, 220B, 220C, 220D having known coordinates within the defined show space 210. For example, an origin point 230 indicates an absolute coordinate $X_0$, $Y_0$, $Z_0$, to which other (relative) positions can be compared (such as the positions of tracking components 220A, 220B, 220C, 220D). As will be apparent to those having ordinary skill in the art, this ensures a mapping process will accurately translate three-dimensional tracking data coordinates of relative object positions 201, 202, 203 to two-dimension video data captured by the camera(s) (using the origin point 230 as a reference).

Thus, with a know origin point 230, the relative positions of tracking system components 220A, 220B, 220C, 220D and one or more cameras (not illustrated in FIG. 2, refer to FIG. 3) can be predetermined. This permits correlation of three-dimensional tracking data for guest positions 201, 202, 203 to be correlated with guest positions in two-dimensional video data, as captured by one or more cameras. The tracking system and the camera(s) are synchronized to an external master clock such that tracking data and video data can be matched, as by using time stamps/metadata of each.

Turning to FIG. 3, the system further includes one or more cameras at predetermined or tracked position(s). As an example, a camera on a robotic track may move about the space via a pre-programmed routine or arbitrarily. Moreover, the camera may move in a path that is not predefined but that is ascertainable (for example, a hand held camera tracked using a magnetic tracking system). So long as the location, orientation and settings of the camera are known, the video data can be related back to the tracking data on a frame-by-frame basis to recreate the show space geometry.

In the illustrated example, a camera 350 is positioned at the origin point 330; however, this is merely an example. The camera position(s) can be any predetermined position, including more than one predetermined position (as with a camera configured to move along a predefined path). Moreover, an array of cameras can be used (as described further herein), so long as the camera positions are known (or are ascertainable).

The number of cameras used can be as few as one or more than one. The use context and the equipment chosen drive the decision regarding the number of cameras used. For example, more than one camera may be used in an attempt to ensure that, if one camera's view is blocked for a particular guest, another camera's view will be clear. Or, more than one camera can be utilized for a particularly large defined show space. For example, with a given desired resolution (for example 720×480 DVD resolution) in a final product, considering the camera parameters (for example 4480×1920 resolution), a known amount of space (for example 12 feet) will be covered by a single camera for a particular amount of cropping (for example, cropping the head and shoulders of a guest). Thus, if the show space exceeds this amount (12 feet), use of more than one camera may be desirable.

As another example, an array of cameras can be positioned together in order to capture video data that can be stitched together to accomplish virtual cinematography, such as a virtual panning effect obtained with an array of fixed position cameras. Such virtual cinematography techniques can be useful for example in providing an appropriate angle of video for a particular guest at a particular time, such as responsive to a determination that a particular guest is blocked by another guest or an inanimate object within the show space. Moreover, virtual cinematography expands the options for special effects that can be included in a personalized video.

No matter the particular use context encountered, an advantage of using an ultra-high resolution camera(s) is that such a camera allows for capturing high quality video data of a plurality of guests simultaneously, which reduces the number of cameras that are required. A non-limiting example of a suitable ultra-high resolution camera is a RED ONE® HD camera available from Red.com Inc. If lower resolution camera(s) is/are used, depending on the particular use context, more cameras will be required to capture adequate video data. RED ONE® is a registered trademark of Red.com Inc. in the United States and other countries.

In FIG. 3, a camera 350 is fixed in a known position 330 relative to the coordinate space of the show. The camera view frustum is known by virtue of known camera parameters and the positioning. Therefore, given a particular set of tracking data from a tracking system, and given a particular camera positioning, such as camera "A" 350, an object's position within the defined show space 310 can be mapped to the two dimensional view frustum of the video data (using standard three-dimensional (3D) to two-dimensional (2D) projection techniques). For example, for a video frame captured by camera "A" 350 at time 00:00:00:01, tracking data for time 00:00:00:01 will indicate X, Y, Z coordinates of a tracked object. Once the area or region of a video frame is identified, it can be sub-sampled and used for inclusion in a custom media product, as further described herein.

Figure 4A:
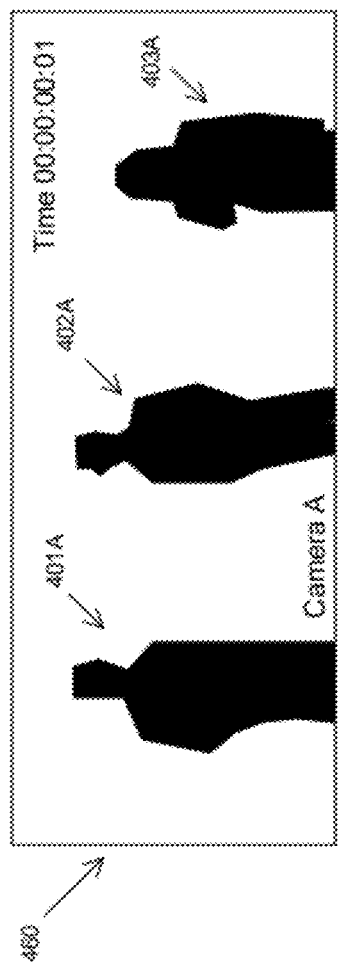
FIG. 4(A-B) illustrates an example video frame and sub-region selections thereof.
Figure 4B:
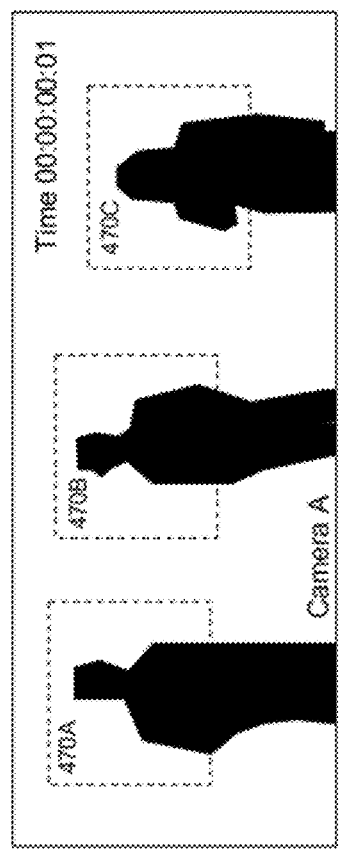

As illustrated in FIG. 4A, a video frame 460 from camera "A" 350 at time 00:00:00:01 is illustrated. Three tracked guests 401A, 402A, 403A are captured in this video frame 460. Using the stored positioning/camera information, the system ascertains that the three guests 401A, 402A, 403A are included in the frame 460. Moreover, the system can determine which regions to crop for inclusion in a custom media project using the tracking data. As illustrated in FIG. 4B, regions 470A, 470B, and 470C are selected for inclusion. These regions 470A, 470B, and 470C within the frame 460 are sub-sampled for inclusion in each guests' product.

Figure 5:
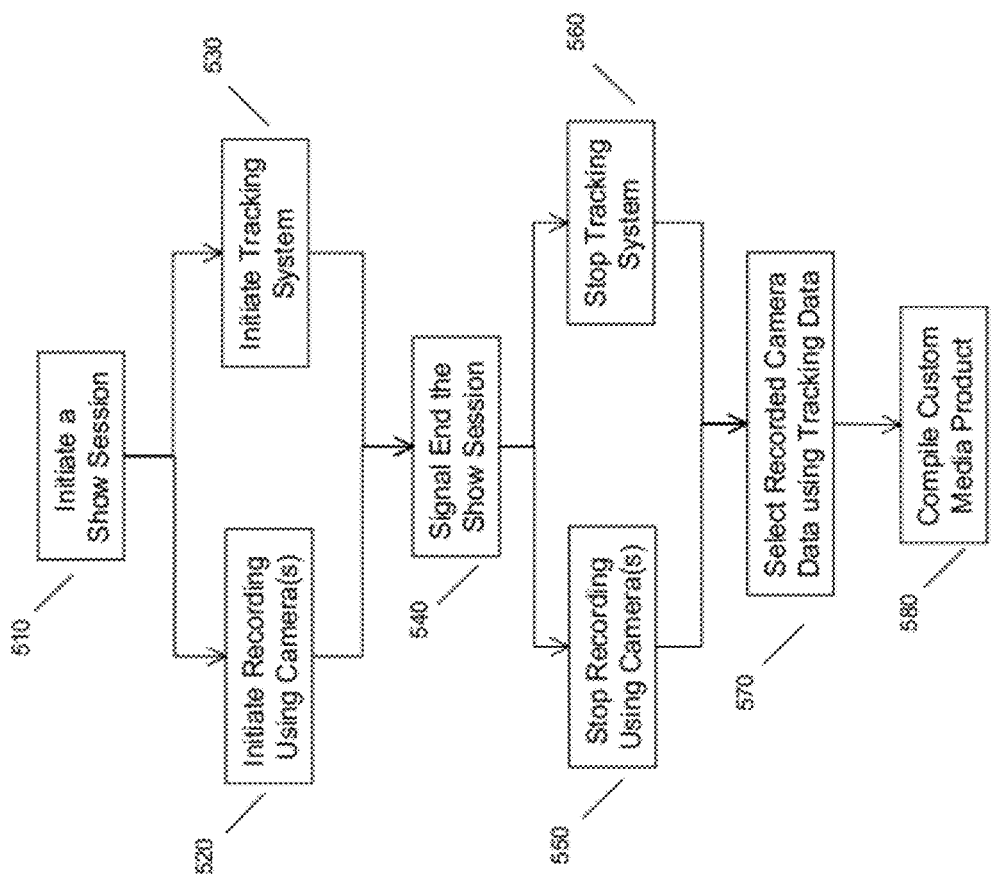
FIG. 5 illustrates an example of custom media product generation.

The system includes one or more intermediary modules that initiate a show session, record session information, signal that a show session has ended and perform automatic processing of the video and tracking data. Referring to FIG. 5, for example, a show control system initiates a show session 510 (for example, as the audience is about to enter the defined show space). A series of software applications record video 520 from the one or more cameras and record tracking data 530 from the tracking system, each with synchronized clocks running during the duration of the show session.

For example, on initiation 510, the video camera(s) begin recording video 520 using a session number as metadata. Simultaneously, another software process begins recording tracking information 530 provided by a tracking system, using as metadata the session number, and whatever additional information the tracking system makes available. Some basic tracking data includes an object/person identification and X, Y coordinate information. Multiple, independent tracking systems can be simultaneously deployed to provide various types of tracking data. Additional information can include height (of the person/object (Z coordinate)), aggregate color of the tracked object (for example, color of clothing), or any other identifying object characteristics. Further metadata might include how long the object/person has been tracked, whether the object is entering or leaving the tracked object database, and the like. Object tracking metadata is dependent on the specific tracking system(s) or method(s) being used. Recording of the video and tracking data continues for the duration of the show session.

At the end of the show, the system signals the software processes that the show is over. All processes stop recording data (video and tracking). Thus, responsive to a signal indicating the end of a show session 540, the one or more cameras stop recording 550 and the tracking system stops tracking 560. A set of software applications take the tracking data and video data, and use the tracking coordinates to extract 570 sub-sampled videos from the raw, high resolution video, and edit them together 580 with additional effects/sounds/bumpers and the like to produce a final output 580 (custom media product) for each tracked guest. It should be noted that the above is a non-limiting example. As an alternative, processing of recording data (video and tracking) could commence prior to the end of a show. Moreover, it is conceivable that camera(s) and tracking system(s) may be configured to continuously record, such as within a show space where guests filter through continuously, such that there is not specific "end" to recording or tracking. Thus, embodiments can begin producing final output prior to the end of the show, in near real time, as is suitable for the particular context encountered.

Figure 6:
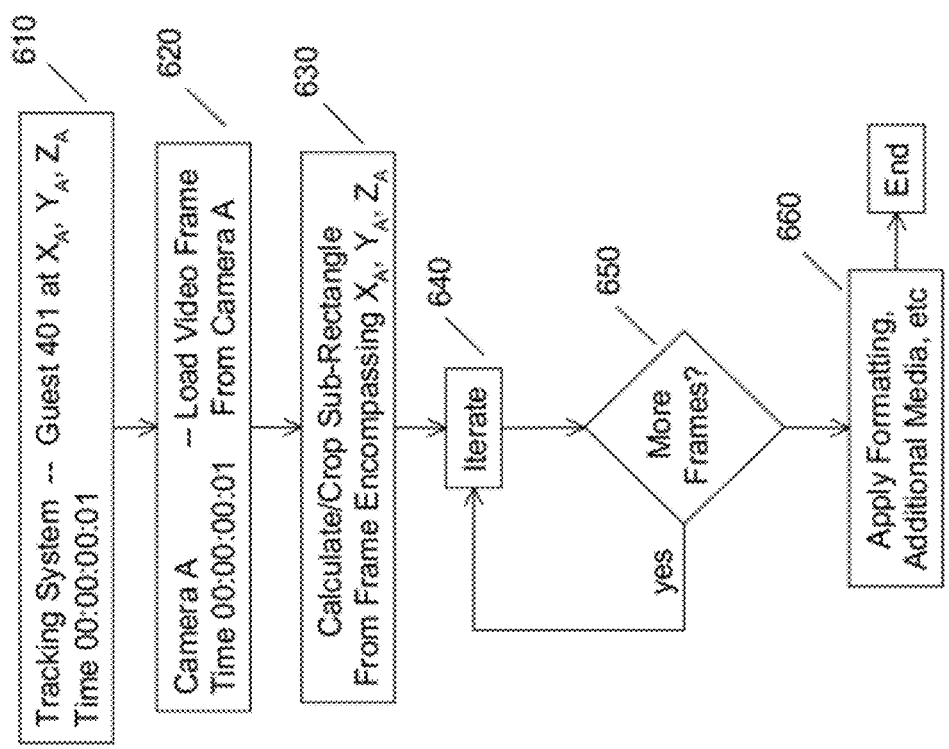
FIG. 6 illustrates an example of custom media product generation.

FIG. 6 illustrates an example workflow. At the end of the show (and end of the recording) the system begins parsing the tracking database for coordinate information for each "time slice" of data available. For a particular time 00:00:00:01, a tracking system obtains 610 coordinates $X_A$, $Y_A$, $Z_A$ for a guest. For example, at time 00:00:00:01, the tracking data may indicate one tracked person at coordinate $X_{100}$, $Y_{100}$, with a height of $Z_{120}$ (for example, 120 cm), for example guest 401A.

Simultaneously, camera "A" captures a video frame that includes guest 401A, which can be determined (for example, using the timing, the tracking coordinates, and the overall known position/camera parameters of camera "A" at a particular time). Using the feed from camera "A", the software loads 620 the video frame with time stamp 00:00:00:01, and (using standard 3D to 2D projection techniques) calculates a sub-region (for example, a sub-rectangle) from that frame which encompasses an area around the head of the guest 401A at the coordinates/height given in the tracking database. This allows a sub-region to be cropped from the high-resolution frame. The process can be iterated 640 as desirable. For example, this process is iterated 640 for all tracked people in the tracking database for the given time stamp, with each sub-sampled video frame saved into a separate video sequence (resulting in one video per tracked guest).

Using the next temporal entry in tracking database (for example, time 00:00:00:03), the software repeats this process, interpolating the sub-rectangles between time stamps if a video frame falls between the entries in the tracking database. This continues until the tracking database entries have been exhausted (the raw video has been sub-sampled for the length of the show).

Optionally, computational image analysis can be utilized to further refine the cropped frame. For example, the system may use the tracked position data to ascertain an approximate location of a subject within the frame, then pass the approximated sub-frame to an image analysis engine that determines the exact location of the subject within the frame (for example using facial feature recognition). The crop bounding box can then be refined to these new coordinates to better reflect the subject's true positioning within the sub-frame. Additionally, any image analysis metadata (including for example expression detection, gender detection, et cetera) could be embedded as metadata to help inform an automatic editing engine.

The cropping of sub-frames may further be influenced by an aesthetic engine that crops sub-frames based on certain aesthetic criteria. For example, it may be more visually pleasing to locate a subject's eyes on the "top thirds line" as compared to center the subject's face directly in the middle of the frame. As another example, it may be more visually pleasing to provide a wider shot if a subject is moving quickly, whereas a tighter shot may be more visually pleasing if the subject is sitting or standing still. The aesthetic engine can for example be hard-coded or use a type of machine learning to increasingly improve shot composition.

Responsive to a determination that database has been exhausted 650, the system applies formatting 660. This formatting can include organizing the video frames together in a sequence, adding stock media and the like to produce a new personalized video file, as described further herein.

A predetermined script can be utilized to automate the formatting. For example, using the known sequence of the show session itself (at what time certain events occur in the defined space), the system may switch to preferred cameras or jump ahead in time for dramatic effect. Thus, in a character meet-and-greet show, when the tracked person walks up to meet the character, a camera specific to capturing the handshake/hug/interaction between the guest and character can be used as a source of video data for sub-sampling frames.

In the example of a character meet-and-greet show, when the character is individually greeting each guest, a predetermined script can dictate certain editing instructions to an editing module. The predetermined script can for example indicate that a skip directly to the time at which the currently tracked individual went up to meet the character is in order, and the use of a particular camera feed is in order. Thus, all preceding and subsequent guest one-on-one encounters (of other individuals captured by the camera utilized) can be omitted, as can feeds from any other cameras that may have video data corresponding to the tracked guest.

Moreover, once the video sequence for a particular guest has been sub-sampled and separated into individual videos, the system may apply video, audio, generated graphics/animation or other special effects overlays (stock media content) to enhance the production value of the videos. For example, pre-recorded opening, closing, or intermediate video/audio sequences may be inserted. Special edits (fades, wipes, et cetera) may also be inserted by the system, according to the predetermined script utilized. Many alternatives are possible. For example, real-time rendered elements may be added. These can include but are not limited to rendered elements that are related to information known about the guest(s) such as guest name, birthday, et cetera.

Moreover, the system may add smoothing or other aesthetic filters to the motion of the sub-sampled frame, rather than simply moving the cropped bounding box one-to-one as a tracked guest moves. For example, ignoring small motions that would cause the frame to "jitter" or ramping the speed of frame movements up and down to more realistically emulate the movement of a physical camera.

The completed videos are now ready for distribution to the guests through an appropriate delivery mechanism. For example, the videos can be written to a storage media such as a DVD, can be transmitted to a wireless device such as a smart phone of the guest, stored and made available for download over the Internet, et cetera. Naturally, the video frames may be included in another type of custom media product, such as a still image or collection of still images, as in a flip book or a collage.

It should also be briefly noted that while a completely automated system has been described herein, wherein manual intervention is not required over and above setting up the show space, selecting camera position(s), selecting tracking system component position(s), and defining a script, manual intervention at any point is permissible. For example, as part of a post-processing step, an individual may include/delete certain media content, select among various stock media content, modify a script or select among various available scripts, and/or modify the desired output medium (DVD, print out of still images, et cetera).

Figure 7:
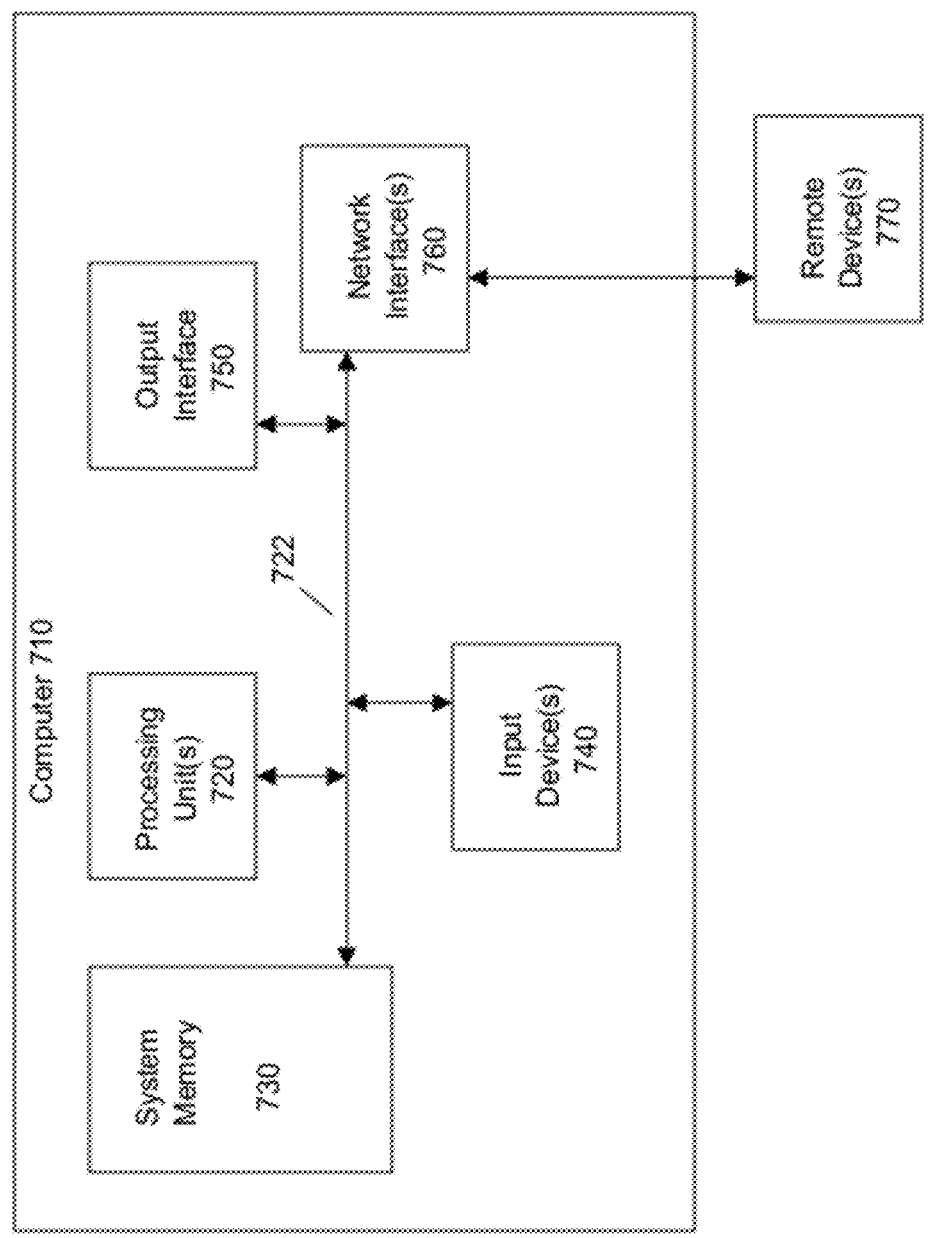
FIG. 7 illustrates an example computer.

Referring to FIG. 7, it will be readily understood that embodiments can be implemented using any of a wide variety of devices or combinations of devices. An example device that may be used in implementing one or more embodiments includes a computing device in the form of a computer 710. In this regard, the computer 710 may execute program instructions configured to perform steps involved in processing data regarding tracking objects/individuals within a show space, receiving and recording video data during a show, selecting an appropriate media content for inclusion in a custom media product, and perform other functionality of the embodiments, as described herein.

Components of computer 710 may include, but are not limited to, processing units 720, a system memory 730, and a system bus 722 that couples various system components including the system memory 730 to the processing unit 720. Computer 710 may include or have access to a variety of computer readable media. The system memory 730 may include computer readable storage media in the form of volatile and/or nonvolatile memory such as read only memory (ROM) and/or random access memory (RAM). By way of example, and not limitation, system memory 730 may also include an operating system, application programs, other program modules, and program data.

A user can interface with (for example, enter commands and information) the computer 710 through input devices 740, which can include remote input devices. Alternatively, a computer may run in a fully or semi-automated or unattended mode. A monitor or other type of device can also be connected to the system bus 722 via an interface, such as an output interface 750. In addition to a monitor, computers may also include other peripheral output devices. The computer 710 may operate in a networked or distributed environment using logical connections to one or more other remote computers or databases, such as a remotely located digital storage system configured to store video data, custom media content, stock media content, and/or tracking data. The logical connections may include a network, such local area network (LAN) or a wide area network (WAN), but may also include other networks/buses.

It should be noted as well that certain embodiments may be implemented as a system, method or computer program product. Accordingly, aspects of the invention may take the form of an entirely hardware embodiment, an entirely software embodiment (including firmware, resident software, micro-code, et cetera) or an embodiment combining software and hardware aspects. Furthermore, aspects of the invention may take the form of a computer program product embodied in one or more computer readable medium(s) having computer readable program code embodied therewith.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative embodiments have been described herein with reference to the accompanying drawings, it is to be understood that the embodiments are not limited to those precise embodiments, and that various other changes and modifications may be affected therein by one skilled in the art without departing from the scope or spirit of the disclosure.

What is claimed is:

1. A method for generating a custom media product comprising:
   receiving tracking data derived from a position tracking system, the tracking data comprising three-dimensional object tracking data of a plurality of objects within a predefined area;
   receiving two-dimensional video data derived from one or more cameras placed at one or more predetermined positions about the predefined area;
   mapping the three-dimensional object tracking data to an image plane of the two-dimensional video data;
   sub-sampling one or more areas of the two-dimensional video data based on the mapping; and
   generating a custom media product including the one or more areas sub-sampled from the two-dimensional video data.

2. The method according to claim 1, wherein the tracking system and the one or more cameras are synchronized.

3. The method according to claim 1, wherein the one or more cameras comprise one or more ultra high resolution cameras.

4. The method according to claim 1, wherein the predefined area is a predefined show space.

5. The method according to claim 1, wherein the custom media product further comprises stock media content combined with one or more areas sub-sampled from the two-dimensional video data, the stock media content being arranged with the one or more areas sub-sampled according to a script to generate the custom media product.

6. The method according to claim 5, wherein the stock media content includes one or more of music, one or more still images, one or more video sequences, and one or more computer generated graphics.

7. The method according to claim 6, wherein generating the custom media product further comprises one or more of writing the custom media product to a storage device and transmitting a media file to an electronic device over a network.

8. The method according to claim 1, wherein the one or more cameras comprise an array of cameras.

9. The method according to claim 8, further comprising utilizing video data from the array of cameras to produce a virtual cinematography effect for the custom media product.

10. The method according to claim 1, wherein the one or more cameras comprise a camera configured to change one or more parameters selected from the group consisting of camera focus, camera zoom, camera angle, and camera location.

11. A computer program product comprising:
    a non-transitory computer readable storage medium having computer readable program code embodied therewith for generating a custom media product, the computer readable program code comprising:
    computer readable program code configured to receive tracking data derived from a position tracking system, the tracking data comprising three-dimensional object tracking data of a plurality of objects within a predefined area;
    computer readable program code configured to receive two-dimensional video data derived from one or more cameras placed at one or more predetermined positions about the predefined area;
    computer readable program code configured to map the three-dimensional object tracking data to an image plane of the two-dimensional video data;
    computer readable program code configured to sub-sample one or more areas of the two-dimensional video data based on mapping of the three-dimensional object tracking data to the image plane of the two-dimensional video data; and
    computer readable program code configured to generate a custom media product including the one or more areas sub-sampled from the two-dimensional video data.

12. The computer program product according to claim 11, wherein the tracking system and the one or more cameras are synchronized.

13. The computer program product according to claim 11, wherein the one or more cameras comprise one or more ultra high resolution cameras.

14. The computer program product according to claim 11, wherein the predefined area is a predefined show space.

15. The computer program product according to claim 11, wherein the custom media product further comprises stock media content combined with one or more areas sub-sampled, the stock media content being arranged with the one or more areas sub-sampled according to a script to generate the custom media product.

16. The computer program product according to claim 15, wherein the stock media content includes one or more of music, one or more still images, one or more video sequences, and one or more computer generated graphics.

17. The computer program product according to claim 11, wherein generating the custom media product further comprises one or more of writing the custom media product to a storage device and transmitting a media file to an electronic device over a network.

18. The computer program product according to claim 11, wherein the one or more cameras comprise an array of cameras.

19. The computer program product according to claim 18, further comprising utilizing video data from the array of cameras to produce a virtual cinematography effect for the custom media product.

20. A system for generating a custom media product comprising:
  one or more processors; and
  a memory operatively connected to the one or more processors;
  wherein, responsive to execution of computer readable program code accessible to the one or more processors, the one or more processors are configured to:
  receive tracking data derived from a position tracking system, the tracking data comprising three-dimensional object tracking data of a plurality of objects within a predefined area;
  receive two-dimensional video data derived from one or more cameras placed at one or more predetermined positions about the predefined area;
  map the three-dimensional object tracking data to an image plane of the two-dimensional video data;
  sub-sample one or more areas of the two-dimensional video data based on mapping of the three-dimensional object tracking data to the image plane of the two-dimensional video data; and
  generate a custom media product including the one or more areas sub-sampled from the two-dimensional video data.

* * * * *